(12) United States Patent
Miyajima et al.

(10) Patent No.: US 7,859,800 B2
(45) Date of Patent: Dec. 28, 2010

(54) MAGNETO-RESISTIVE EFFECT ELEMENT MAGNETIC DISK DEVICE HAVING MAGNETO-RESISTIVE EFFECT FILM AND METHOD OF FORMING A CPP-TYPE MAGNETO-RESISTIVE EFFECT ELEMENT HAVING A SOFT MAGNETIC LAYER COMPOSED OF COLUMNAR CRYSTAL

(75) Inventors: Toyoo Miyajima, Kawasaki (JP); Mineharu Tsukada, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 1054 days.

(21) Appl. No.: 11/589,110

(22) Filed: Oct. 30, 2006

(65) Prior Publication Data
US 2007/0297100 A1 Dec. 27, 2007

(30) Foreign Application Priority Data
Jun. 27, 2006 (JP) ............................. 2006-177100

(51) Int. Cl.
*G11B 5/39* (2006.01)
*H04R 31/00* (2006.01)

(52) U.S. Cl. ............................. 360/324.11; 29/603.13

(58) Field of Classification Search ............. 360/324.11
See application file for complete search history.

(56) References Cited

U.S. PATENT DOCUMENTS

| 6,495,275 B2 * | 12/2002 | Kamiguchi et al. .... 360/324.11 |
| 6,884,521 B2 * | 4/2005 | Takahashi et al. ........... 428/832 |
| 2003/0076627 A1 * | 4/2003 | Minor et al. ................. 360/125 |
| 2005/0073778 A1 * | 4/2005 | Hasegawa et al. ......... 360/324.1 |
| 2007/0035886 A1 * | 2/2007 | Kagami et al. .............. 360/319 |
| 2007/0188934 A1 * | 8/2007 | Meguro et al. .............. 360/313 |
| 2008/0112091 A1 * | 5/2008 | Shimazawa et al. ....... 360/324.1 |
| 2009/0009913 A1 * | 1/2009 | Komagaki ................... 360/319 |

FOREIGN PATENT DOCUMENTS

| JP | 10-256619 | 9/1998 |
| JP | 10308004 A | * 11/1998 |
| JP | 2004103204 A | * 4/2004 |

OTHER PUBLICATIONS

Haifeng et al, "Ultrathin high anisotropic magnetoresistance Ni0.81Fe0.19 films", 2006 J. Phys. D: Appl. Phys. 39 4915.*

(Continued)

*Primary Examiner*—Julie Anne Watko
(74) *Attorney, Agent, or Firm*—Westerman, Hattori, Daniels & Adrian, LLP

(57) ABSTRACT

A magneto-resistive effect element is provided with a first soft magnetic layer, a magneto-resistive effect film formed directly on the first soft magnetic layer, and a second soft magnetic layer formed on the magneto-resistive effect film. The magneto-resistive effect element is configured as allowing electric current to flow in the thickness-wise direction. The first soft magnetic layer is composed of columnar crystals. The magneto-resistive effect film has an anti-ferromagnetic layer. The anti-ferromagnetic layer is formed directly on the first soft magnetic layer.

18 Claims, 11 Drawing Sheets

OTHER PUBLICATIONS

Bae et al, "High thermal stability of exchange-biased bilayers and bottom giant magnetoresistive spin valves using an alpha-Fe2O3 antiferromagnetic layer", Appl. Phys. Let. 78, 26, 4163-4165 (Jun. 25, 2001).*

Masakiyo Tsunoda, et al., "Magnetic anisotrophy and rotational hysteresis loss in exchange coupled Ni-Fe/Mn-Ir films", Journal of Applied Physics, vol. 87, No. 9, May 1, 2000, pp. 4375-4388.

* cited by examiner

200nm

200nm

— 311
— 222
— 220
— 200
— 211

MAGNETO-RESISTIVE EFFECT ELEMENT MAGNETIC DISK DEVICE HAVING MAGNETO-RESISTIVE EFFECT FILM AND METHOD OF FORMING A CPP-TYPE MAGNETO-RESISTIVE EFFECT ELEMENT HAVING A SOFT MAGNETIC LAYER COMPOSED OF COLUMNAR CRYSTAL

CROSS-REFERENCE TO RELATED APPLICATIONS

This application is based upon and claims the benefit of priority from the prior Japanese Patent Application No. 2006-177100, filed on Jun. 27, 2006, the entire contents of which are incorporated herein by reference.

BACKGROUND OF THE INVENTION

1. Field of the Invention

The present invention relates to a magneto-resistive effect element aimed at improving output stability, and a magnetic disk device using the same.

2. Description of the Related Art

A magneto-resistive effect element is an element making use of a physical phenomenon such that magneto-resistivity largely varies depending on a relative angle of magnetization between two magnetic layers. The magneto-resistive effect element can be exemplified by a giant magneto-resistive effect (GMR) element and a tunnel-type magneto-resistive effect (TMR) element, for example. The magneto-resistive effect element applied to a reading head of a magnetic head generally adopts a spin-valve-type structure. In the spin-valve-type structure, magnetization in one magnetic layer is pinned, and magnetization in the other magnetic layer is allowed to freely move in response to the external magnetic field. In order to stably operate the magneto-resistive effect element applied to the magnetic head, it is necessary to thoroughly pin the one magnetization. For pinning of the magnetization in the magnetic layer, a generally adopted method is such as producing an exchange-coupled magnetic field by stacking an anti-ferromagnetic layer and a ferromagnetic layer. Enhancement of the exchange-coupled magnetic field is considered as making large contributions in improvement in stability, and also in output, of the magneto-resistive effect element.

Structures of the magneto-resistive effect element are roughly classified into the CIP (current-in-plane) structure and the CPP (current-perpendicular-to-plane) structure. A sense current in the CIP structure flows through a film composing the magneto-resistive effect element in the in-plane direction, and a sense current in the CPP structure flows in the direction normal to a film composing the magneto-resistive effect element.

In the magneto-resistive effect element having the CIP structure, as shown in FIG. 7, an alumina film 102 is formed on a substrate 101, and thereon a NiFe plated film is formed as a lower shield layer 104. Further on the lower shield layer 104, an amorphous alumina film 103, a GMR film 105, a hard layer 107, an electrode 109, an alumina film 106 and an upper shield layer 108 are formed. A NiFe plated film is formed as the upper shield layer 108.

In the GMR film 105, an underlying film, an anti-ferromagnetic film, a ferromagnetic pinned layer, a non-magnetic intermediate layer, a ferromagnetic free layer and a cap layer are stacked on the alumina film 103. Formation of the underlying film on the alumina film 103 in an amorphous state results in a large grain size of crystal grains in the underlying film, and results in a large grain size of crystal grains also in the anti-ferromagnetic film. As a consequence, magnetization in the anti-ferromagnetic film is stabilized, and the exchange-coupled magnetic field is intensified.

As has been described in the above, the magneto-resistive effect element having the CIP structure can intensify the exchange-coupled magnetic field, by using the amorphous alumina film 103, and consequently by enlarging the crystal grains of the anti-ferromagnetic film formed thereon.

As a trend towards higher recording densities in magnetic recording media advances, there are growing demands for further down-sizing and larger sensitivity. In this situation, the magneto-resistive effect element of the CPP-type is more effective than the magneto-resistive effect element of the CIP-type. The CPP-type, magneto-resistive effect element yields a larger output as the element size decreases. Also a TMR film making use of a tunnel-type magneto-resistive effect is often used, in place of the GMR film.

In the magneto-resistive effect element having the CPP structure, as shown in FIG. 8, an alumina film 202 is formed on a substrate 201, and thereon a NiFe plated film is formed as a lower shield layer 204. Further on the lower shield layer 204, a GMR film 205, an alumina film 206, a hard layer 207 and an upper shield layer 208 are formed. A NiFe plated film is formed as the upper shield layer 208.

In the GMR film 205, an underlying film, an anti-ferromagnetic film, a ferromagnetic pinned layer, a non-magnetic intermediate layer, a ferromagnetic free layer and a cap layer are stacked on the lower shield layer 204. A TMR film may sometimes be used in place of the GMR film 205. In this case, a tunnel insulating film is used in place of the non-magnetic intermediate layer.

In the magneto-resistive effect element of the CPP type, the alumina film, which is an insulating film, cannot be provided between the GMR film 205 and the lower shield layer 204, because it is necessary to allow current to flow between the upper shield layer 208 and the lower shield layer 204. As the lower shield layer 204, a soft magnetic film mainly composed of NiFe or the like is formed by plating. The soft magnetic film formed by plating has a crystal grain size of several tens nanometers or around, and also the anti-ferromagnetic film epitaxially grown thereon has a crystal grain size of several tens nanometers or around. In other words, the magneto-resistive effect element of the CPP type cannot enlarge the crystal grain size of the anti-ferromagnetic film as compared with that in the CIP type. Therefore, the exchange-coupled magnetic field cannot be intensified to a satisfactory degree, and the problem results in only an insufficient output of the magneto-resistive effect element, and/or degraded stability of the output.

On the other hand, the intensity of the exchange-coupled magnetic field reportedly depends on orientation of the crystal grains in the anti-ferromagnetic film (Masakiyo Tsunoda et al., J. Appl. Phys., 87, 4375 (2000)). However, in the conventional magneto-resistive effect elements of the CPP structure, the lower shield layer 204 is composed of gathering of fine crystal grains showing almost no crystal orientation. It is therefore impossible to control the crystal orientation of the anti-ferromagnetic film epitaxially grown thereon.

A related art is disclosed in Japanese Patent No. 3295013.

SUMMARY OF THE INVENTION

It is therefore an object of the present invention to provide a magneto-resistive effect element able to improve output stability, and a magnetic disk device using the same.

The present inventors have gone through extensive investigations aiming at solving the above-described problems, and have reached embodiments of the present invention shown below.

A magneto-resistive effect element according to the present invention has a first soft magnetic layer; a magneto-resistive effect film formed on the first soft magnetic layer; and a second soft magnetic layer formed on the magneto-resistive effect film, and is configured as allowing electric current to flow in the thickness-wise direction. The first soft magnetic layer is composed of columnar crystals (crystals having a columnar structure), and the magneto-resistive effect film has an anti-ferromagnetic layer formed directly on the first soft magnetic layer.

A magnetic disk device according to the present invention has a magnetic disk, and a magnetic head reading information recorded in the magnetic disk. The magnetic head has the magneto-resistive effect element described above.

In a method of fabricating a CPP-type magneto-resistive effect element according to the present invention, a first soft magnetic layer composed of a columnar crystal is formed, then a magneto-resistive effect film is formed directly on the first soft magnetic layer. Next, a second soft magnetic layer is formed on the magneto-resistive effect film. In forming the magneto-resistive effect film, an anti-ferromagnetic film is formed directly on the first soft magnetic layer.

DETAILED DESCRIPTION OF THE PREFERRED EMBODIMENTS

Paragraphs below will specifically explain embodiments of the present invention, referring to the attached drawings.

First Embodiment

Figure 1A:
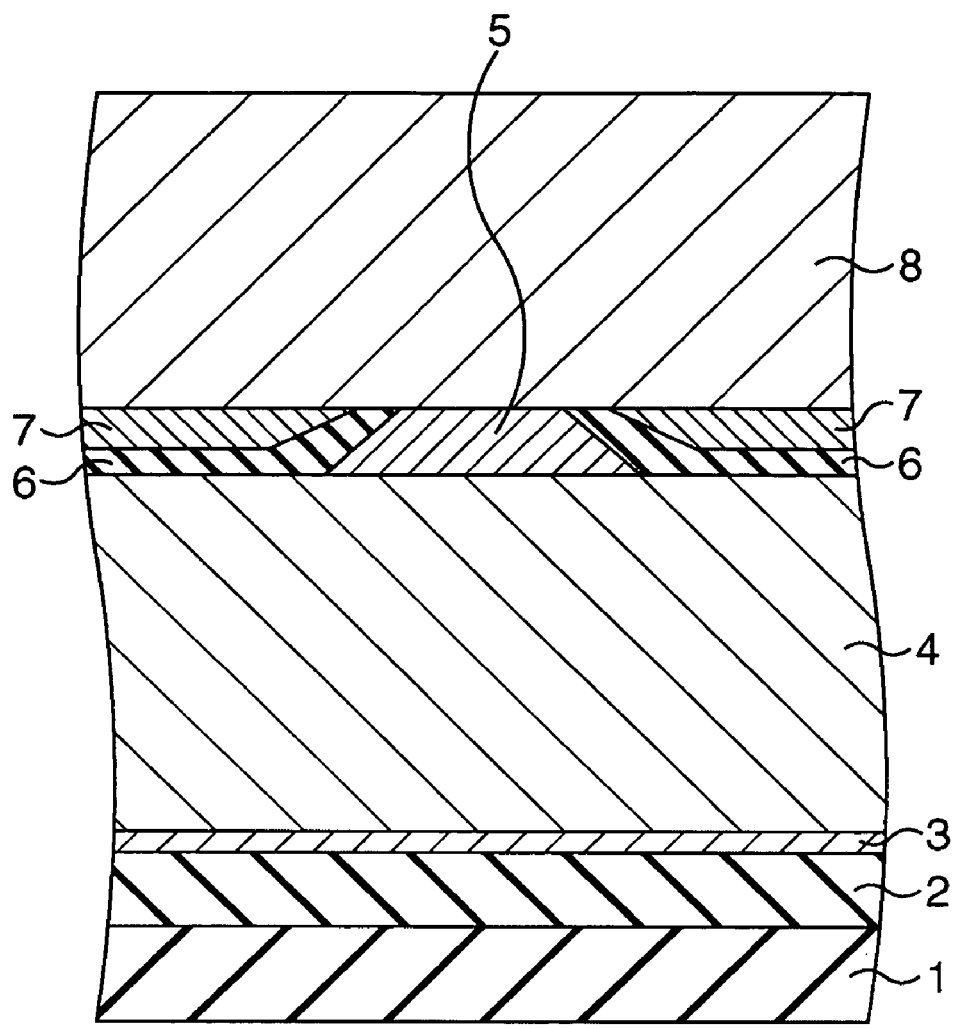
FIG. 1A is a sectional view showing a CPP-type magneto-resistive effect element configuration according to a first embodiment of the present invention.
Figure 1B:
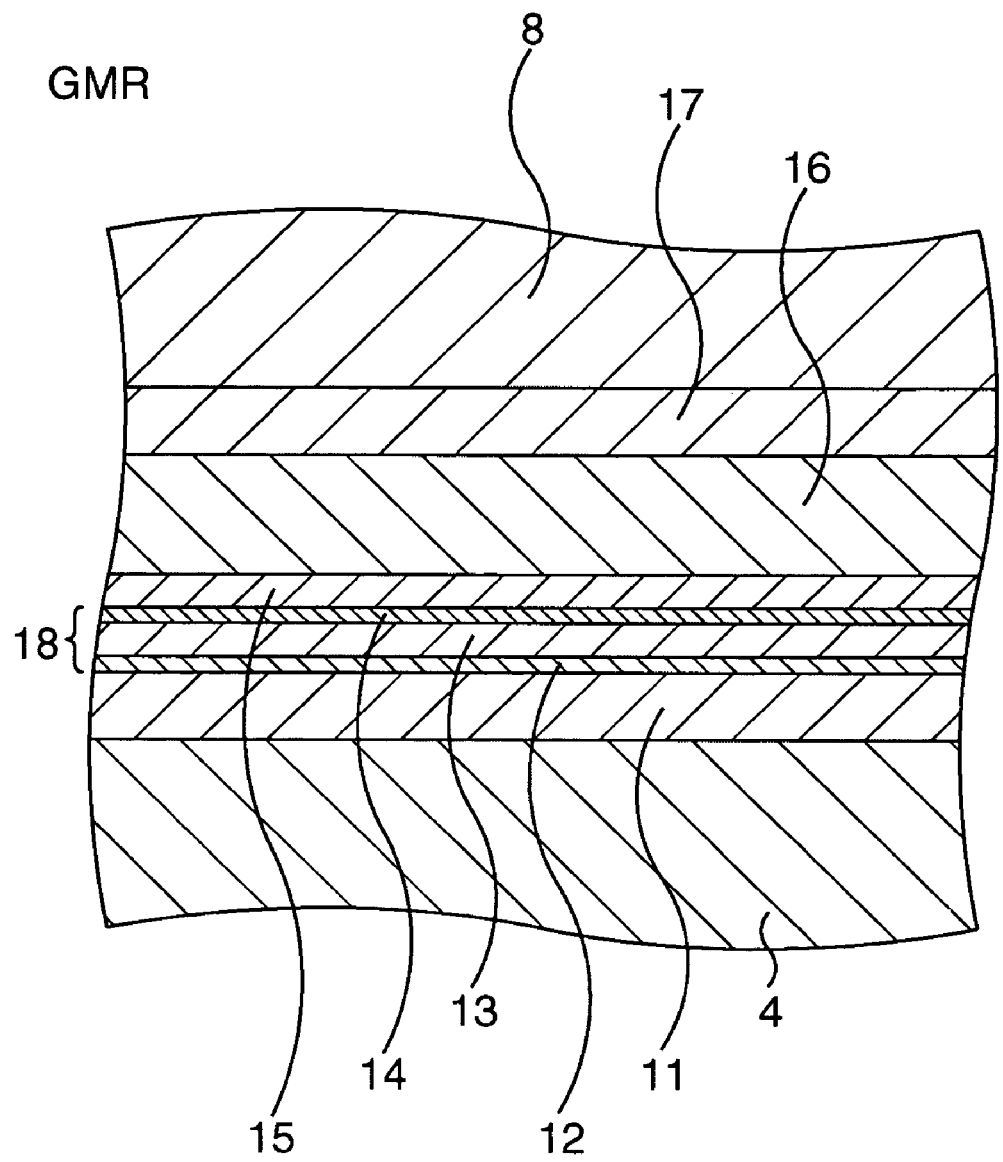
FIG. 1B is a sectional view showing a configuration of a GMR film composing the magneto-resistive effect element according to the first embodiment.

The first embodiment of the present invention will be explained. FIG. 1A is a sectional view showing a configuration of a CPP-type magneto-resistive effect element according to the first embodiment of the present invention, and FIG. 1B is a sectional view showing a configuration of a GMR film composing the magneto-resistive effect element according to the first embodiment.

In the first embodiment, as shown in FIG. 1A, an alumina film 2 is formed on a substrate 1, and an alignment control film 3 is formed on the alumina film 2. As the substrate 1, a ceramic substrate composed of AlTiC or the like, or a silicon substrate is used, for example. As the alignment control film 3, for example, a Ti film, a Ta film, a Ru film, a MgO film or the like is used. The thickness of the alignment control film 3 is approximately 5 nm, for example.

On the alignment control film 3, a soft magnetic lower shield layer 4 is formed. A NiFe film, for example, is used as the lower shield layer 4. The thickness of the lower shield layer 4 is, for example, 0.5 µm to 2 µm or around. Crystal grains in the lower shield layer 4 appear as of a columnar crystal, and the grain size thereof is, for example, several hundreds nanometers or above. The surface of the lower shield layer 4 appears as the (111) surface or the (100) surface, when expressed using Miller indices. More specifically, the surface of the lower shield layer 4 appears as the (111) surface if a Ti film, a Ta film or a Ru film is used as the alignment control film 3, and appears as the (100) surface if a MgO film is used.

On the lower shield layer 4, a GMR film 5 having a mesa-formed section is formed. The GMR film has, as shown in FIG. 1B, an anti-ferromagnetic film 11 as being formed on the lower shield layer 4. As the anti-ferromagnetic film 11, a PtMn film, a PdPtMn film, a NiMn film, a FeMn film or an IrMn film can be used, for example. The thickness of the anti-ferromagnetic film 11 is, for example, 5 nm to 25 nm or around. In particular for the case where an IrMn film is used, the thickness thereof is 5 nm to 10 nm or around, and for the case where a PtMn film is used, the thickness thereof is 10 nm to 25 nm or around.

On the anti-ferromagnetic film 11, there is formed a magnetization pinned layer 18 having a stacked ferri-structure, composed of a ferromagnetic film 12, a non-magnetic film 13 and a ferromagnetic film 14. As the ferromagnetic films 12 and 14, a CoFe film or a NiFe film can be used, for example. The thickness of the ferromagnetic films 12 and 14 is, for example, 1.5 nm to 2.5 nm or around. As the non-magnetic film 13, a Ru film, a Rh film or a Cr film can be used, for example. The thickness of the non-magnetic film 13 is, for example, 0.8 nm to 1 nm or around.

On the magnetization pinned layer 18, a non-magnetic intermediate film 15, a ferromagnetic film 16 and a cap film 17 are formed. As the non-magnetic intermediate film 15, a Cu film can be used, for example. The thickness of the non-magnetic intermediate film 15 is, for example, 2 nm or around. As the ferromagnetic film 16, a CoFe film or a NiFe film can be used, for example, wherein the ferromagnetic film 16 functions as a magnetization free layer. The thickness of the ferromagnetic film 16 is, for example, 2 nm or around. As the cap film 17, a Ta film or a Ru film, for example, is formed. Because the magnetization pinned layer 18 herein has the stacked ferri-structure, leakage of magnetic field from the magnetization pinned layer 18 can be suppressed, and thereby any adverse influences on the magnetization in the ferromagnetic film 16 functioning as the magnetization free layer can be suppressed.

The GMR film 5 is thus configured. The width of the bottom surface of the GMR film 5 is, for example, 100 nm or around. On the other hand, as described previously, the crystal grain size of the lower shield layer 4 is, for example, several hundreds nanometers or above. It is therefore highly probable that the GMR film 5 is formed on a single crystal grain of the lower shield layer 4.

Around the GMR film 5, an alumina film 6 is formed, as shown in FIG. 1A, and a hard film 7 is formed on the alumina film 6. As the hard film 7, a CoPt film or a CoCrPt film can be used, for example. On these layers, a soft-magnetic upper shield layer 8 is formed. As the upper shield layer 8, a NiFe film can be used, for example. The thickness of the upper shield layer 8 is, for example, 0.5 μm to 2 μm or around. The grain size in the upper shield layer 8 is not specifically limited.

Figure 8:
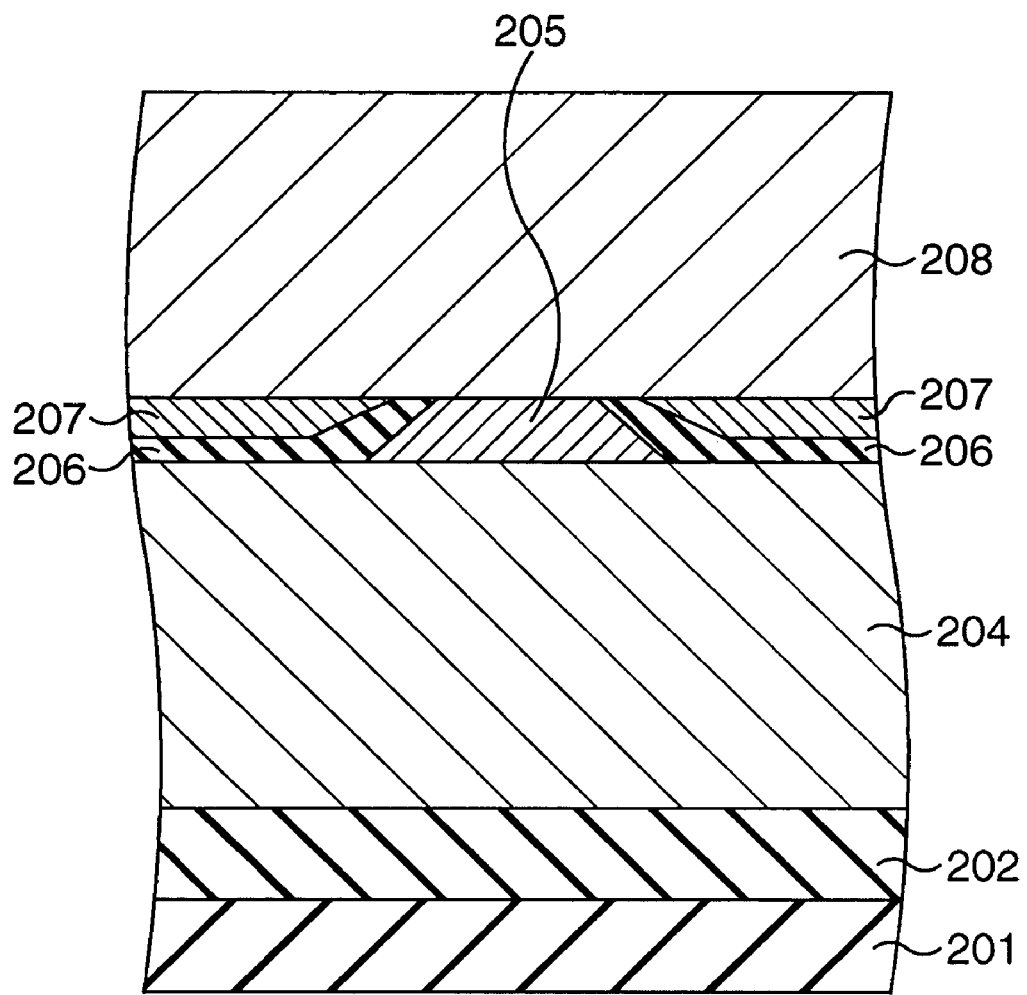
FIG. 8 is a sectional view showing a configuration of a conventional magneto-resistive effect element having a CPP structure.

In thus-configured first embodiment, crystals in the lower shield layer 4 are columnar crystals aligned in a predetermined direction, so that also the crystals in the anti-ferromagnetic film 11 are aligned in a similar manner. If the (111) surface appears on the surface of the lower shield layer 4, it can be understood that the [110] direction, exhibiting a maximum performance of pinning, appears with a frequency of "6/(2 π) rad=1/60", with respect to the direction of pinning. If the (100) surface appears on the surface of the lower shield layer 4, it can be understood that the [110] direction appears with a frequency of "4/(2 π) rad=1/90" with respect to the direction of pinning. On the other hand, in the conventional magneto-resistive effect element of the CPP structure shown in FIG. 8, the crystal orientation is not controlled at all, so that the frequency of appearance of the [110] direction with respect to the direction of pinning is only as small as "12/(4 π) sr≈1/3437". Therefore, according to this embodiment, the frequency of alignment of the [110] direction with the direction of pinning can be improved up to 38 to 57 times or around. As a consequence, the pinning of magnetization in the magnetization pinned layer 18 is made more robust, and thereby output of the magneto-resistive effect element can be stabilized.

Paragraphs below will explain a method of fabricating the magneto-resistive effect element of CPP type according to the first embodiment. FIG. 2A to FIG. 2E are sectional view schematically showing process steps of a method of fabricating the magneto-resistive effect element according to the first embodiment.

Figure 2A:
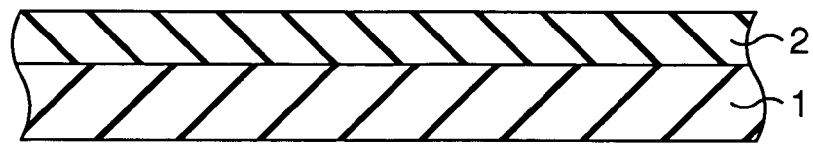
FIGS. 2A to 2E are sectional views sequentially showing process steps of a method of fabricating the magneto-resistive effect element according to the first embodiment.

First, as shown in FIG. 2A, the alumina film 2 in an amorphous state is formed on the substrate 1 by sputtering, for example.

Figure 2B:
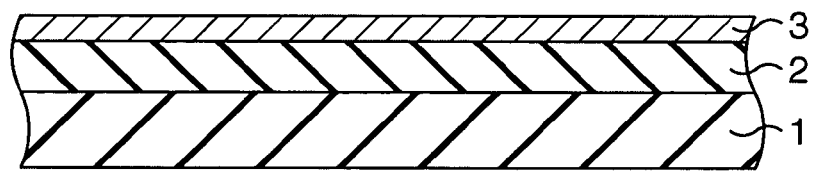

Next, as shown in FIG. 2B, the alignment control film 3 is formed on the alumina film 2 by sputtering, for example. As the alignment control film 3, a Ti film, a Ta film, a Ru film, a MgO film or the like is formed as described above.

Figure 2C:
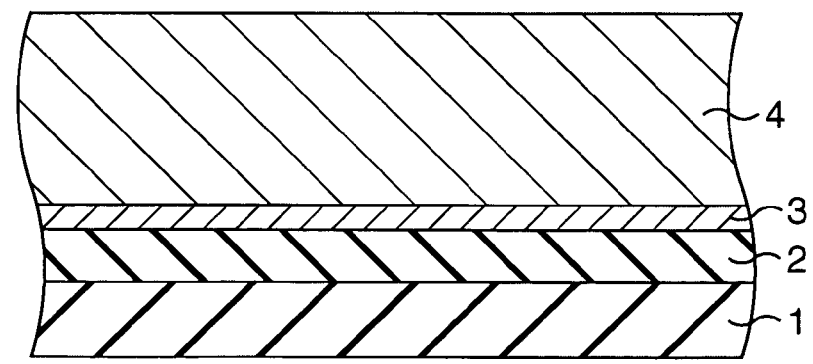

Next, as shown in FIG. 2C, the lower shield layer 4 is formed on the alignment control film 3 by sputtering, for example. In this process, the crystal grains composing the lower shield layer 4 appear as columnar crystals. If a Ti film, a Ta film or a Ru film is formed as the alignment control film 3, the surface of the lower shield layer 4 appears as the (111) surface. On the other hand, if a MgO film is formed as the alignment control film 3, the surface of the lower shield layer 4 appears as the (100) surface. The surface of the lower shield layer 4 is then planarized by CMP (chemical mechanical polishing), for example.

Figure 2D:
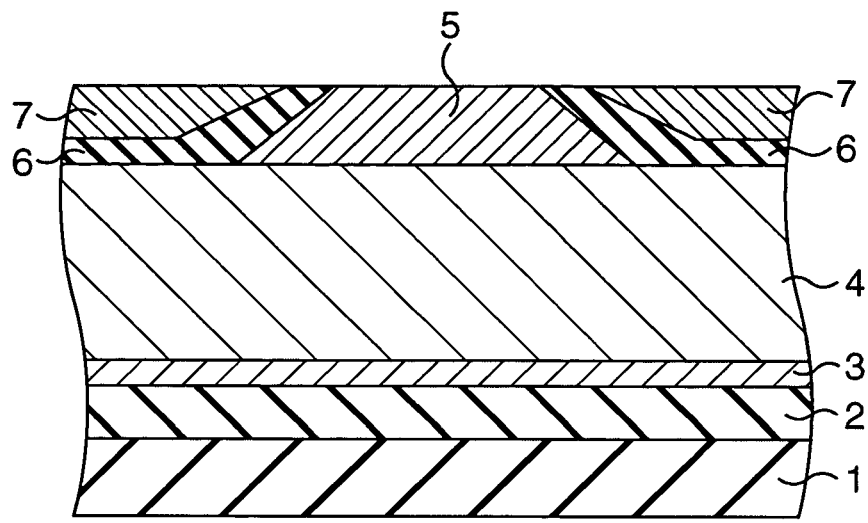

Next, as shown in FIG. 2D, the GMR film 5 is formed on the lower shield layer 4. Fabrication of the GMR film 5 begins with epitaxial growth of the anti-ferromagnetic film 11 on the lower shield layer 4 by sputtering, for example. In this process, the anti-ferromagnetic film 11 appears as showing the (111) surface or the (100) surface on the surface thereof, reflecting the crystal structure of the lower shield layer 4. Next, on the anti-ferromagnetic film 11, the magnetization pinned layer 18 (the ferromagnetic film 12, the non-magnetic film 13 and the ferromagnetic film 14), the non-magnetic intermediate film 15, the magnetization free layer (the ferromagnetic layer 16) and the cap film 17 are sequentially formed by sputtering, for example. The stack ranging from the anti-ferromagnetic film 11 to the cap film 17 is then patterned. Next, the alumina film 6 and the hard film 7 are formed on the lower shield layer 4, and the surface of the GMR film 5 is allowed to expose.

Figure 2E:
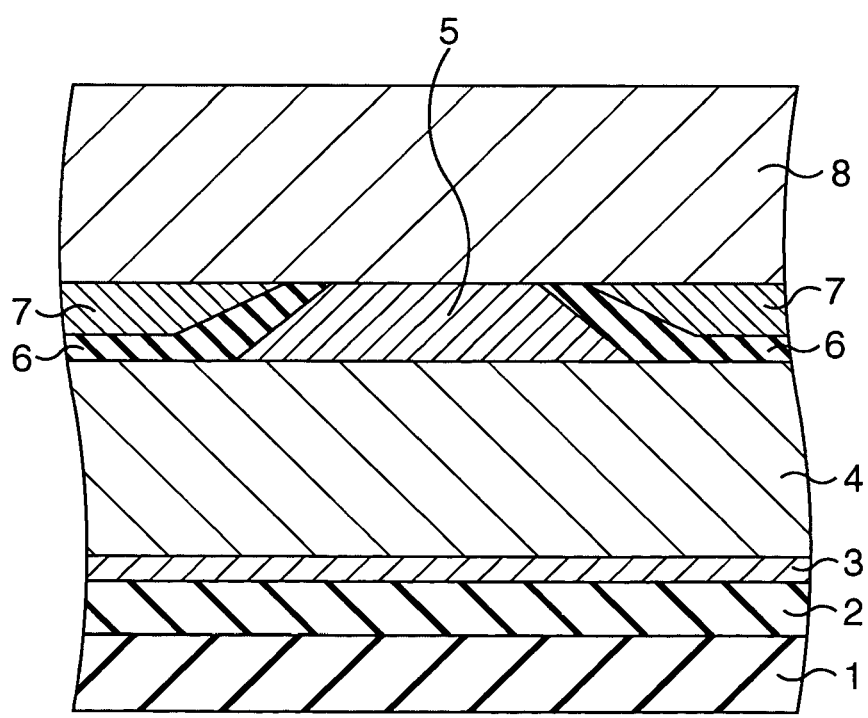

Thereafter, as shown in FIG. 2E, the upper shield layer 8 in contact with the cap film 17 in the GMR film 5 is formed by plating, for example, to thereby complete the magneto-resistive effect element.

Figure 3A:
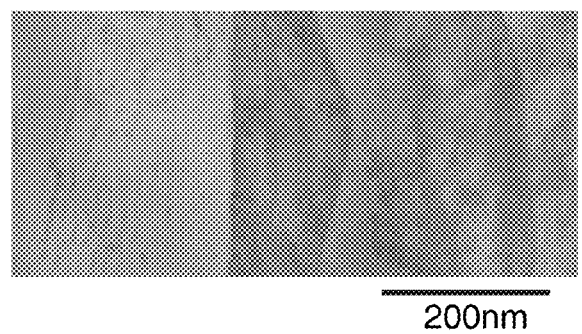
FIG. 3A is a microphotograph showing crystal grains of a lower shield layer 4.

According to the method described above, the present inventors fabricated the magneto-resistive effect element using a MgO film as the alignment control film 3, observed the lower shield layer 4 (NiFe film) under a microscope, and obtained a microphotograph shown in FIG. 3A. In FIG. 3A, the direction of stacking of the lower shield layer 4 and the like is defined as the upward direction. Observation of a diffraction pattern of this image yielded the result shown in FIG. 3B. In short, the surface of the lower shield layer 4 appeared as the (100) surface.

Figure 3B:
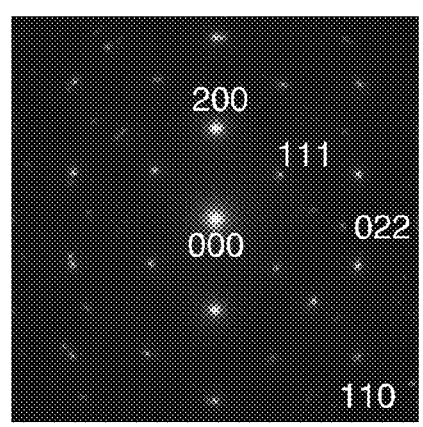
FIG. 3B is a photograph showing a diffraction pattern of the image shown in FIG. 3A.
Figure 3C:
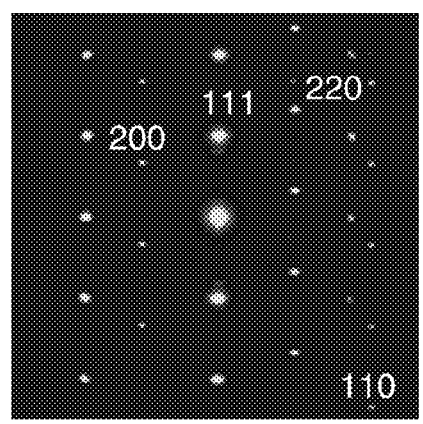
FIG. 3C is a photograph showing a diffraction pattern of a case using another alignment control film 3.

Another magneto-resistive effect element was fabricated also by using a Ti film as the alignment control film 3, and a diffraction pattern thereof was observed similarly to as shown in FIG. 3B, yielding the result shown in FIG. 3C. In short, the surface of the lower shield layer 4 appeared as the (111) surface.

Figure 4A:
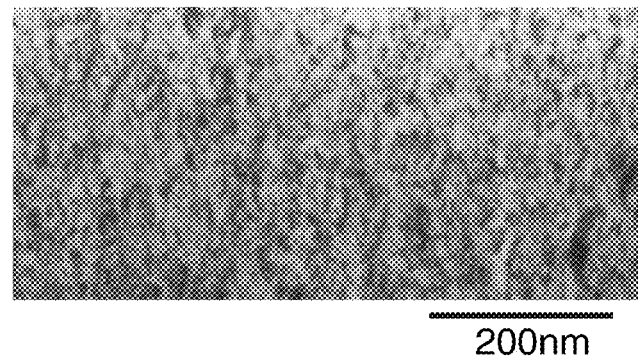
FIG. 4A is a microphotograph showing crystal grains of a lower shield layer 204.
Figure 4B:
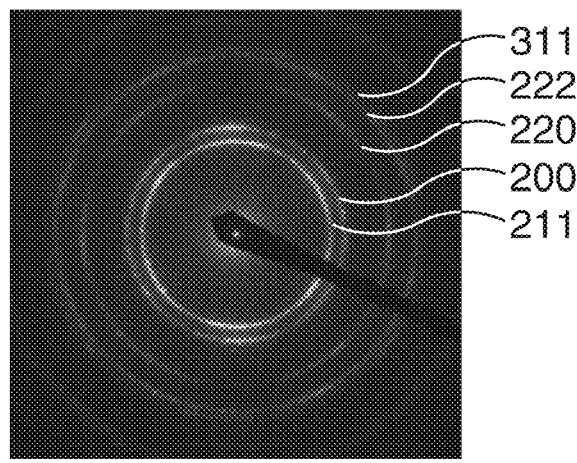
FIG. 4B is a photograph showing a diffraction pattern of the image shown in FIG. 4A.

The present inventors fabricated still another magneto-resistive effect element, according to the conventional method (FIG. 8), without forming the alignment control film 3, and the lower shield layer 204 (NiFe film) was observed under a microscope, to thereby obtain the photograph shown in FIG. 4A. In FIG. 4A, the direction of stacking of the lower shield layer 204 and the like is defined as the upward direction. The crystal grain size was found to be extremely as small as several tens nanometers. Observation of a diffraction pattern of this image yielded the result shown in FIG. 4B. In short, it was confirmed that the crystal grains were not aligned with any directions at all.

Figure 5:
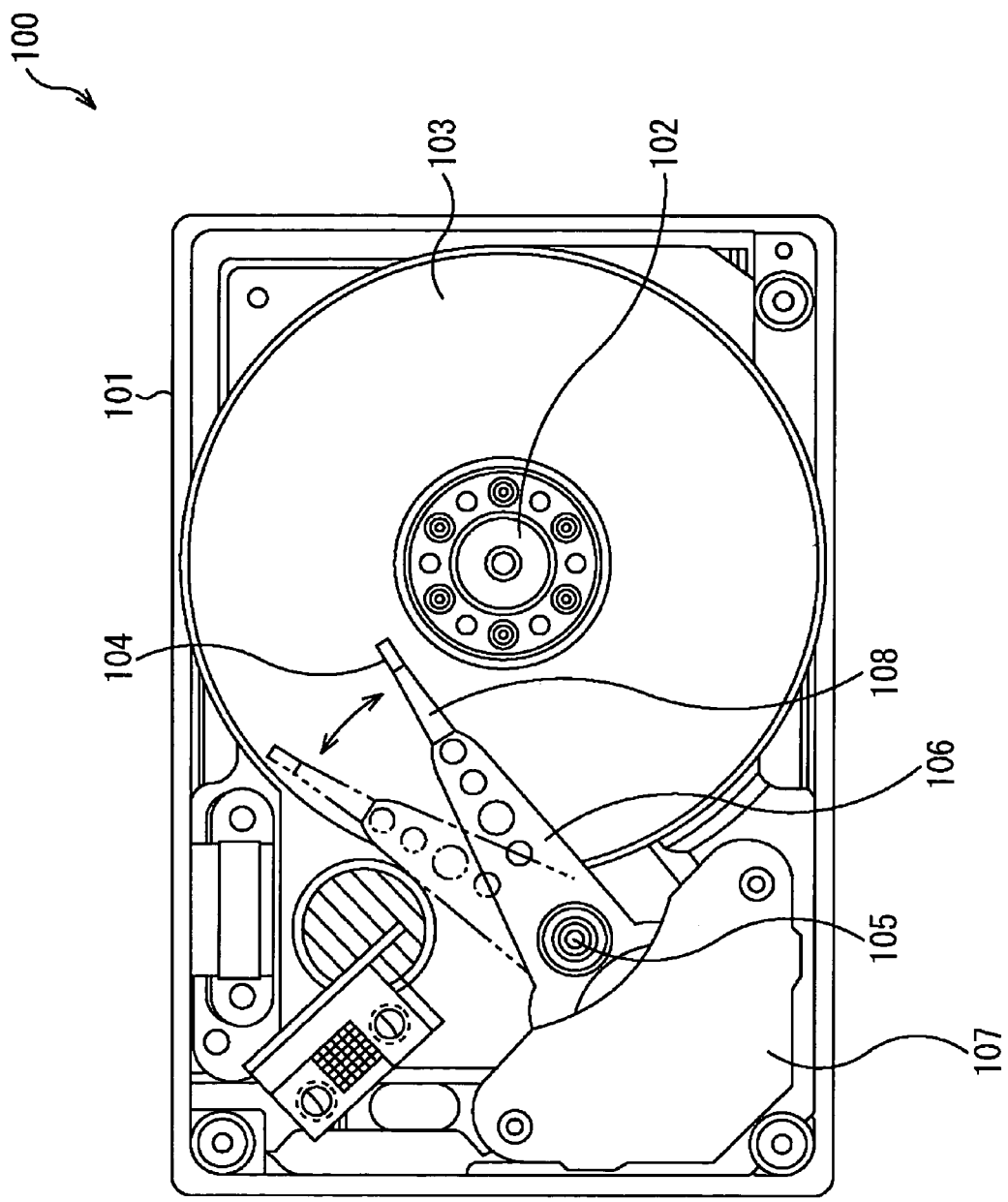
FIG. 5 is a drawing showing an internal configuration of a hard disk drive (HDD)

An explanation will now be made on a hard disc drive, as one example of the magnetic disk drive provided with a magnetic head containing the magneto-resistive effect element according to the first embodiment. FIG. 5 is a drawing showing an internal configuration of the hard disk drive (HDD).

A housing 101 of the hard disk drive 100 houses a magnetic disk 103 rotatable as being attached to a rotation axis 102; a slider 104 having mounted thereon a magnetic head taking part in recording information to and reading information from the magnetic disk 103; a suspension 108 supporting the slider 104; a carriage arm 106 having the suspension 108 fixed thereon and moving around an arm axis 105 and along the surface of the magnetic disk 103; and an arm actuator 107 driving the carriage arm 106. The magnetic head used herein is such as containing the magneto-resistive effect element according to the first embodiment. Thus-configured HDD may be fabricated by housing the magnetic disk 103, the magnetic head and the like at predetermined positions in the housing 101.

Second Embodiment

Figure 6A:
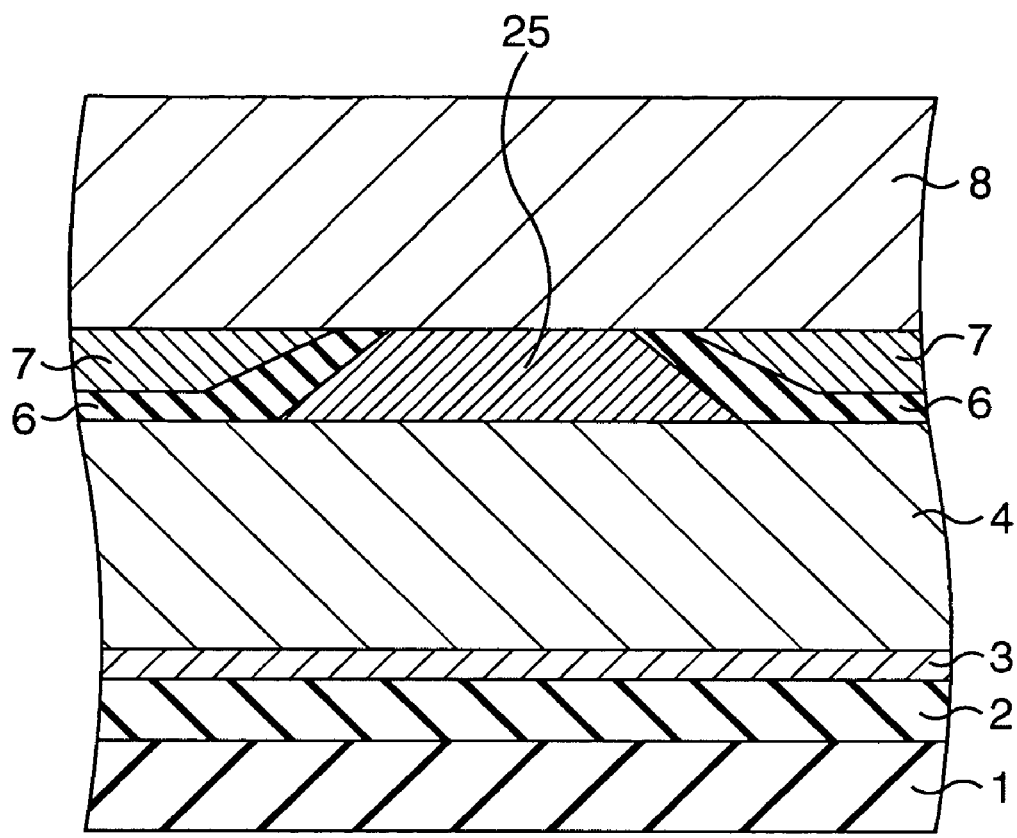
FIG. 6A is a sectional view showing a configuration of a CPP-type magneto-resistive effect element according to a second embodiment of the present invention.
Figure 6B:
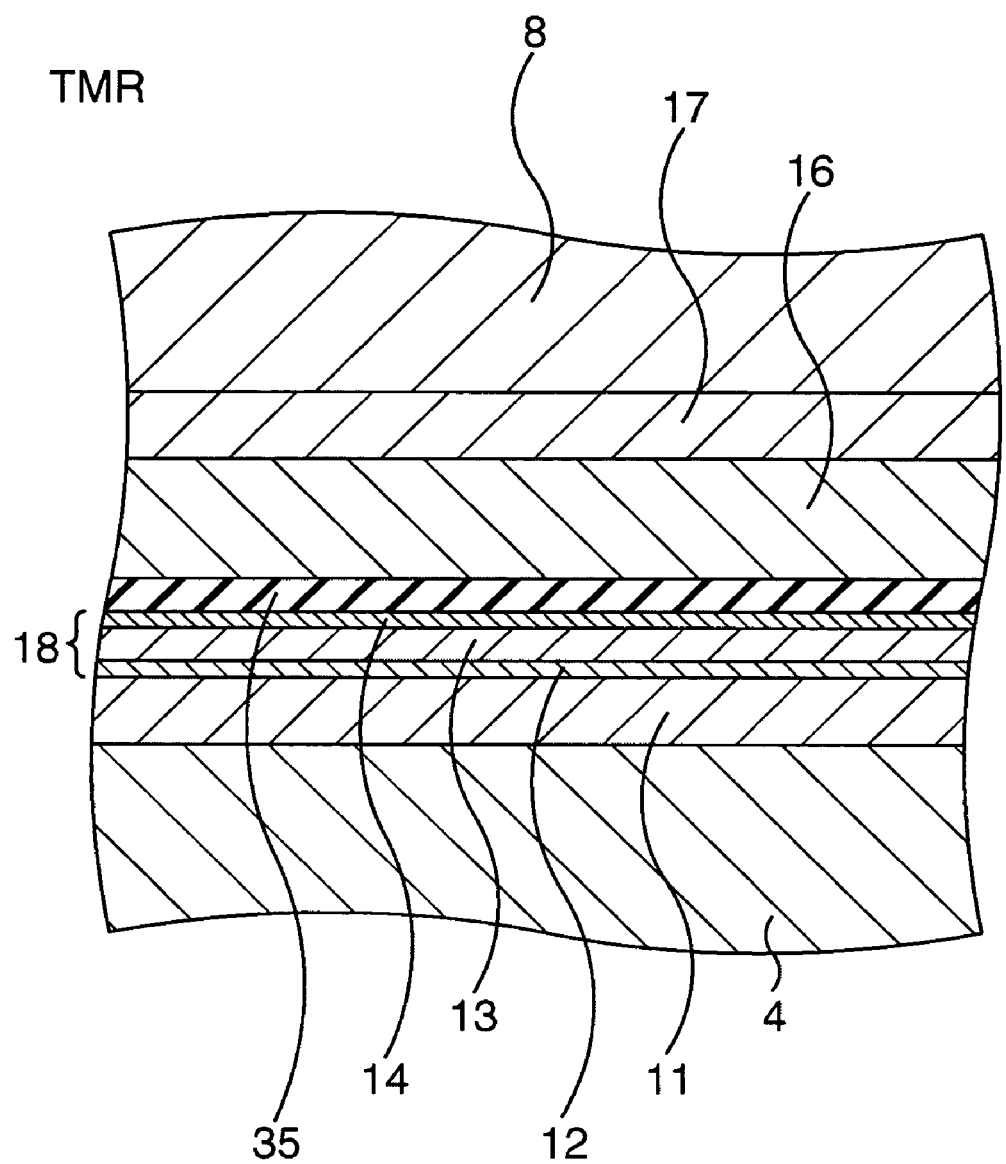
FIG. 6B is a sectional view showing a configuration of a TMR film composing the magneto-resistive effect element according to the second embodiment.
Figure 7:
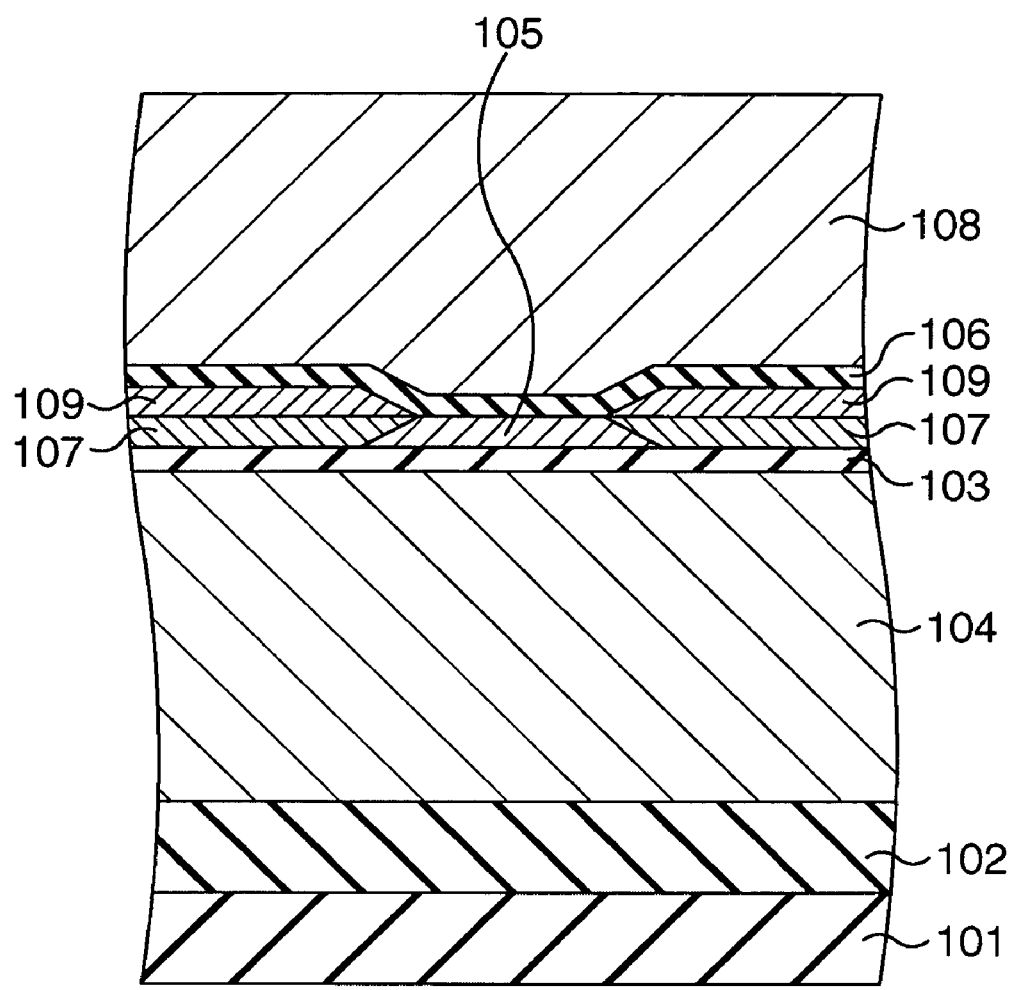
FIG. 7 is a sectional view showing a configuration of a conventional magneto-resistive effect element having a CIP structure.

Next, a second embodiment of the present invention will be explained. The first embodiment relates to a GMR element having the GMR film 5, whereas the second embodiment relates to a TMR element having a TMR film. FIG. 6A is a sectional view showing a configuration of a CPP-type magneto-resistive effect element according to the second embodiment of the present invention, and FIG. 6B is a sectional view showing a configuration of the TMR film composing the magneto-resistive effect element according to the second embodiment.

In the second embodiment, as shown in FIG. 6A, a TMR film 25 is formed in place of the GMR film in the first embodiment. In the TMR film 25, as shown in FIG. 6B, the anti-ferromagnetic film 11 is formed on the lower shield layer 4. Further on the anti-ferromagnetic film 11, there is formed a magnetization pinned layer 18 having a stacked ferri-structure, composed of the ferromagnetic film 12, the non-magnetic film 13 and the ferromagnetic film 14. On the magnetization pinned layer 18, a tunnel insulating film 35, the ferromagnetic film 16 and the cap film 17 are formed. As the tunnel insulating film 35, a magnesium oxide film, an aluminum oxide film or a titanium oxide film can be used, for example. The thickness of the tunnel insulating film 35 is, for example, 1 nm or around. Similarly to as in the first embodiment, the ferromagnetic film 16 functions as a magnetization free layer. The thickness of the ferromagnetic film 16 is, for example, 4 nm to 6 nm or around. The TMR film 25 is thus configured. The width of the bottom surface of the TMR film 25 is, for example, 100 nm or around. On the other hand, as described previously, the crystal grain size of the lower shield layer 4 is, for example, several hundreds nanometers or above. It is therefore highly probable that the TMR film 25 is formed on a single crystal grain of the lower shield layer 4.

Other configurations are same as those in the first embodiment. The magneto-resistive effect element according to the second embodiment may be fabricated by forming the tunnel insulating film 35 in place of the non-magnetic intermediate film 15.

Effects similar to those in the first embodiment can be obtained also by the second embodiment explained above.

In the first and the second embodiments, it is also allowable to form an underlying film between the lower shield layer 4 and the anti-ferromagnetic film 11, similarly to as in the CIP structure. More specifically, a NiCr film, a NiFeCr film, a Ru film or the like may be formed. As the soft-magnetic shield layer, not only a NiFe layer (permalloy layer), but also a FeAlSi layer (sendust layer) or the like may be used.

The columnar crystal composing the lower shield layer 4 can be enlarged by annealing the lower shield layer 4, after being formed, at 280° C. or above. For an exemplary case where the crystal grain size before annealing is hundred and several tens of nanometers, the size can be enlarged to several hundreds nanometers by annealing. This sort of annealing is very effective, because irregularity in the alignment can further be reduced as the crystal grains grow larger.

Because the anti-ferromagnetic film in the present invention is formed directly on the soft magnetic layer composed of a columnar crystal, the crystal orientation thereof is stabilized, and also the direction of magnetization thereof is stabilized. Therefore, pinning of magnetization required in the magneto-resistive effect film can be stabilized, and stability in the output can consequently be improved.

What is claimed is:

1. A magneto-resistive effect element comprising;
    a first soft magnetic layer;
    a magneto-resistive effect film formed directly on said first soft magnetic layer; and
    a second soft magnetic layer formed on said magneto-resistive effect film,
    configured as allowing electric current to flow in the thickness-wise direction,
    said first soft magnetic layer being composed of columnar crystals, and
    said magneto-resistive effect film having an anti-ferromagnetic layer, said anti-ferromagnetic layer, being formed directly on said first soft magnetic layer 2. The magneto-resistive effect element according to claim 1, wherein said first soft magnetic layer has the (111) surface exposed to the surface thereof 3. The magneto-resistive effect element according to claim 2, further comprising an alignment control film formed directly under said first soft magnetic layer and consisting of any one element selected from the group consisting of Ti, Ta and Ru.

4. The magneto-resistive effect element according to claim 1, wherein said first soft magnetic layer has the (100) surface exposed to the surface thereof.

5. The magneto-resistive effect element according to claim 4, further comprising an alignment control film composed of MgO formed directly under said first soft magnetic layer.

6. The magneto-resistive effect element according to claim 1, wherein said magneto-resistive effect film is a CPP-type giant magneto-resistivity effect film or a tunnel-type magneto-resistive effect film.

7. The magneto-resistive effect element according to claim 1, wherein said first soft magnetic layer is a NiFe layer or an FeAlSi layer.

8. The magneto-resistive effect element according to claim 1, wherein said magneto-resistive effect film is formed on a single crystal grain out of one, or two or more crystal grains composing said first soft magnetic layer.

9. A magnetic disk device comprising:
    a magnetic disk; and
    a magnetic head reading information recorded in said magnetic disk,
    said magnetic head having the magneto-resistive effect element according to claim 1.

10. A method of fabricating a CPP-type magneto-resistive effect element comprising the steps of:
    forming a first soft magnetic layer composed of a columnar crystal;
    forming a magneto-resistive effect film directly on said first soft magnetic layer; and
    forming a second soft magnetic layer on said magneto-resistive effect film;
    configured as allowing electric current to flow in the thickness-wise direction;
    said step of forming the magneto-resistive effect film having a step of forming an anti-ferromagnetic film directly on the first soft magnetic layer and said magneto-resistive effect film having an anti-ferromagnetic layer.

11. The method of fabricating a magneto-resistive effect element according to claim 10, wherein said first soft magnetic layer is formed so as to expose the (111) surface to the surface thereof.

12. The method of fabricating a magneto-resistive effect element according to claim 11, further comprising the step of, prior to said step of forming the first soft magnetic layer, forming an alignment control film consisting of any one element selected from the group consisting of Ti, Ta and Ru, the first soft magnetic layer being formed directly on the alignment control film.

13. The method of fabricating a magneto-resistive effect element according to claim 10, wherein said first soft magnetic layer is formed so as to expose the (100) surface to the surface thereof.

14. The method of fabricating a magneto-resistive effect element according to claim 13, further comprising the step of, prior to said step of forming the first soft magnetic layer, forming an alignment control film composed of MgO, the first soft magnetic layer being formed directly on the alignment control film.

15. The method of fabricating a magneto-resistive effect element according to claim 10, wherein a giant magneto-resistive effect film or a tunnel-type magneto-resistive effect film is formed as the magneto-resistive effect film.

16. The method of fabricating a magneto-resistive effect element according to claim 10, wherein a NiFe layer or an FeAlSi layer is formed as the first soft magnetic layer.

17. The method of fabricating a magneto-resistive effect element according to claim 10, wherein the first soft magnetic layer is formed by sputtering.

18. The method of fabricating a magneto-resistive effect element according to claim 10, wherein the magneto-resistive effect film is formed on a single crystal grain out of one, or two or more crystal grains composing the first soft magnetic layer.

* * * * *